(12) United States Patent
Nakaniwa

(10) Patent No.: US 7,667,823 B2
(45) Date of Patent: Feb. 23, 2010

(54) OPTICAL DEVICE, AND METHOD OF MEASURING THE DIMENSION OF OBJECT USING OPTICAL DEVICE

(75) Inventor: Kazuhide Nakaniwa, 2-9-1, Sakuragaoka, Minoo-shi, Osaka (JP) 562-0046

(73) Assignees: Kansai Kouji Sokuryou Co., Ltd., Minoo-Shi, Osaka (JP); Kazuhide Nakaniwa, Minoo-Shi, Osaka (JP)

( * ) Notice: Subject to any disclaimer, the term of this patent is extended or adjusted under 35 U.S.C. 154(b) by 32 days.

(21) Appl. No.: 12/066,756

(22) PCT Filed: Jun. 26, 2006

(86) PCT No.: PCT/JP2006/312731
§ 371 (c)(1),
(2), (4) Date: Apr. 25, 2008

(87) PCT Pub. No.: WO2007/032136
PCT Pub. Date: Mar. 22, 2007

(65) Prior Publication Data
US 2009/0135401 A1 May 28, 2009

(30) Foreign Application Priority Data
Sep. 15, 2005 (JP) ............... 2005-268435
Mar. 8, 2006 (JP) ............... 2006-062740

(51) Int. Cl.
*G01C 3/08* (2006.01)
(52) U.S. Cl. ............... 356/4.01; 356/3.1; 356/3.15; 356/4.1; 356/5.1; 356/5.15
(58) Field of Classification Search ........ 356/3.01–28.5
See application file for complete search history.

(56) References Cited

U.S. PATENT DOCUMENTS 5,892,617 A * 4/1999 Wallace ............... 359/353

(Continued)

FOREIGN PATENT DOCUMENTS

JP 08-086601 4/1996

(Continued)

OTHER PUBLICATIONS

Form PCT/ISA/210 (International Search Report) dated Sep. 12, 2006.

*Primary Examiner*—Thomas H Tarcza
*Assistant Examiner*—Luke D Ratcliffe
(74) *Attorney, Agent, or Firm*—Buchanan Ingersoll & Rooney PC

(57) ABSTRACT

A device and a method for measuring the sizes of a remote object, for example, concrete crack, without using a high-place work vehicle or a ladder. An optical apparatus (e.g. a measuring device (10)) used for this purpose is provided with a telescope (16) having a reticule plate (46). The reticule plate (46) is provided with a plurality of reference scales (52) used for comparison with the size (W) of the image (C') of an object (C) projected onto the reticule plate (46). The size of the object can be measured using the size of the object image measured with the reference scales (52) and a distance (a distance from a reference point $P_0$ a to the object) measured with a distance measuring unit (20) of the optical apparatus.

14 Claims, 13 Drawing Sheets

U.S. PATENT DOCUMENTS

| | | | |
|---|---|---|---|
| 7,164,467 B2 * | 1/2007 | Heinke et al. | 356/4.03 |
| 2008/0098640 A1 * | 5/2008 | Sammut et al. | 42/122 |

FOREIGN PATENT DOCUMENTS

| | | | |
|---|---|---|---|
| JP | 8-094752 A | | 4/1996 |
| JP | 9-021627 A | | 1/1997 |
| JP | 3037959 U | | 6/1997 |
| JP | 2002-013295 A | | 1/2002 |
| JP | 2002013295 | * | 1/2002 |

* cited by examiner

OPTICAL DEVICE, AND METHOD OF MEASURING THE DIMENSION OF OBJECT USING OPTICAL DEVICE

TECHNICAL FIELD

The present invention relates to an optical apparatus and, in particular, to an optical apparatus which is preferably used for measuring dimensions of objects such as widths of cracks occurred on a surface of a concrete structure. The present invention also relates to a method for measuring dimensions of objects by using the optical apparatus.

BACKGROUND OF THE INVENTION

One of the methods for diagnosing the degree of degradation of a concrete structure, such as a bridge, a tunnel, and a building, includes a measurement of widths of cracks (i.e., dimensions in a direction perpendicular to a crack progressing direction) occurred on the surface of concrete. The typical method for measuring the crack widths uses a conventional scale or a crack scale exclusively designed for crack measurement which is placed on the concrete surface to visually measure the crack width. Disadvantageously, this measurement limits the measuring places within a reach of the measurer.

JP 08-947752 A proposes a crack measuring device which includes an elongate rod and a scale or a crack scale attached on the tip of the rod. This also limits the measuring places within a range of the rod, so that the cracks on the bridge beam or the top ceiling of the tunnel are incapable of being measured even by this device.

Accordingly, there is no option other than to use a vehicle designed exclusively for works at elevated places or a ladder for measuring cracks occurred on higher portions of the concrete structure, which requires much time for the crack measurement. Still, the cracks on higher places outside the reach of the vehicle or the ladder are unable to be measured.

Therefore, the present invention provides an optical apparatus which allows for measuring dimensions of objects such as cracks of about 0.1 millimeter to several millimeters width and occurred on concrete structures, for example, from a remote place (e.g., a place several to several hundreds of meters away from the objects) and a method for measuring the dimensions of the objects by using the optical apparatus.

SUMMARY OF THE INVENTION

In order to achieve the object, an optical apparatus (10) according to the present invention has a telescope (16) which includes a reticule plate (46) into which an image (C') of an object (C) will be projected and the plate (46) has a plurality of reference scales (52) for comparison in dimension with the projected image (C').

In another aspect of the optical apparatus of the present invention, the reference scales (52) are spaced away from each other and arranged in line in a direction orthogonal to an optical axis (38) of the telescope (16) or in a circumferential direction around the optical axis (38).

In still another aspect of the optical apparatus of the present invention, each of the reference scales (52) is a mark extended in two-dimensional directions on the plate (46).

In still another aspect of the optical apparatus of the present invention, each of the marks of the reference scales (52) has a dimension in the arranged direction which is different from those of other marks of other reference scales (52).

In still another aspect of the optical apparatus of the present invention, each of the marks has a square or a round in shape when viewed from above.

In still another aspect of the optical apparatus of the present invention, indexes (54) corresponding to the dimensions of the reference scales (52) are placed adjacent the respective reference scales (52).

In still another aspect of the optical apparatus of the present invention, the optical apparatus (10) also has means (20) for measuring a distance ($L_0$) from a reference point ($P_0$) of the optical apparatus (10) to an object (C) to be collimated by the telescope (16).

In still another aspect of the optical apparatus of the present invention, the distance measuring means (20) has a laser distance measuring unit or an ultrasonic distance measuring unit.

In still another aspect of the optical apparatus of the present invention, the optical apparatus has an input (22) with which an index (54) corresponding to each of the reference scales (52) is inputted and a calculation means (32) for calculating the dimension (W) of the object (C) by using the index (54) inputted with the input (22) and the distance ($L_0$) measured by the distance measuring means (20).

In still another aspect of the optical apparatus of the present invention, the optical apparatus has an output (26) for outputting the dimension (W) of the object (C) calculated by the calculation means (32).

In still another aspect of the optical apparatus of the present invention, the image (C') of the object (C) is a crack occurred on a concrete structure.

A method for measuring a dimension of an object by using an optical apparatus according to the present invention has a first step of preparing a telescope (16) including a reticule plate (46) supporting a plurality of reference scales (52) formed thereon and a distance measuring unit (20) for measuring a distance (L) from a reference point ($P_0$) of the telescope (16) to an object (C) to be collimated by the telescope (16), and a second step of calculating a dimension (W) of the object (C) by using a value (54) obtained by comparing an image (C') of an object (C) projected onto the plate (46) of the telescope (16) with one or more reference scales (52) and the distance (L) measured by the distance measuring means (20).

In another aspect of the measuring method of the present invention, the object (C) is a crack occurred on a surface (Q) on a concrete structure and the second step further includes sub-steps of determining the distance (L) from the plate (46) to the crack (C) by using the distance ($L_0$); and determining the width (W) of the crack (C) by using the value (W'), distance (L), and angle (θ).

In still another aspect of the measuring method of the present invention, the object (C) is a crack occurred on a surface (Q) of a concrete structure and the second step further includes sub-steps of:

determining the distance (L) from the plate (46) to the crack (C) based upon the distance ($L_0$);

supposing a line ($L_1$) on the surface (Q) extending in a direction orthogonal to a transverse direction of the crack;

determining coordinates ($P_{1(1)}$ and $P_{1(2)}$) of at least two points on the line ($L_1$) and a coordinate ($P_{1(3)}$) of a point on the surface (Q);

defining the line ($L_1$) by using the coordinates $P_{1(1)}$ and $P_{1(2)}$;

defining the surface (Q) by using the coordinates $P_{1(1)}$, $P_{1(2)}$, and $P_{1(3)}$;

determining a coordinate ($P_0'$) of a first intersection where a line ($L_3$) extending from the reference point ($P_0$) and perpendicularly across the surface (Q) intersects with the surface (Q);

determining a coordinates ($P_0''$) of a second intersection where a line ($L_2$) extending from the reference point ($P_0$) and perpendicularly across the line ($L_1$) intersects with the line ($L_1$);

determining an angle (θ) between the line ($L_2$) connecting the reference point ($P_0$) and the second intersection coordinates ($P_0''$) and a line ($L_4$) connecting the first intersection coordinates ($P_0'$) and the second intersection coordinates ($P_0''$); and determining the width (W) of the crack (C) by using the value (W'), distance (L), and angle (θ).

A method for measuring a width of a crack according to the present invention has a first step of preparing an optical apparatus (10) provided with a telescope (16) having a plate (46) on which a plurality of reference scales (52) are placed and a distance measuring unit (20) for measuring a distance ($L_0$) from a crack portion ($C_1$) on a plane (Q) to be collimated by the telescope (16) to a reference point ($P_0$) of the telescope (16); and a second step of calculating a transverse dimension (W) of a crack portion ($C_1$) by using a value (W') obtained by comparing a crack image (C') projected onto the plate (46) of the telescope (16) with one or more reference scales (52) and the distance ($L_0$) measured by the distance measuring means (20).

In another aspect of the measuring method for a crack width of the present invention, the second step further includes sub-steps of determining the distance (L) from the plate (46) to the crack (C) based upon the distance ($L_0$); and determining the width (W) of the crack (C) by using the value (W'), distance (L), and angle (θ).

In still another aspect of the measuring method for A crack width of the present invention, the second step is further includes sub-steps of determining an angle (θ) between a plane ($Q_0$) including a line ($L_1$) extending along the crack image (C') and the reference point ($P_0$) and the plane (Q);

determining a distance (L) from the plate (46) to the crack portion ($C_1$) based upon the distance ($L_0$); and determining the width (W) by using the value (W'), angle (θ) and distance (L).

According to the optical apparatus and the method, the dimension of the remote object such as crack on the concrete is measured without using any vehicle designed exclusively for works at elevated places or ladder.

PREFERRED EMBODIMENTS OF THE INVENTION

With reference to the accompanying drawings, discussions will be made to an optical apparatus according to the present invention and a method for measuring the dimensions of an object by using such an optical apparatus. In this application, "an optical apparatus" includes a telescopic apparatus, a collimating apparatus with a telescope, and a measuring apparatus with a collimation function and a distance measuring function. The "object" is not limited to an independent object with a certain dimension and may be a part or portion of the object, such as a part of a crack occurred in the concrete structure. To facilitate the understanding of the invention, a following discussion will be made to an embodiment in which the invention is incorporated in the measuring apparatus and a method for measuring a dimension such as a width of the crack occurred in the concrete structure by using the measuring apparatus.

1-1: Measuring Apparatus

Figure 1:
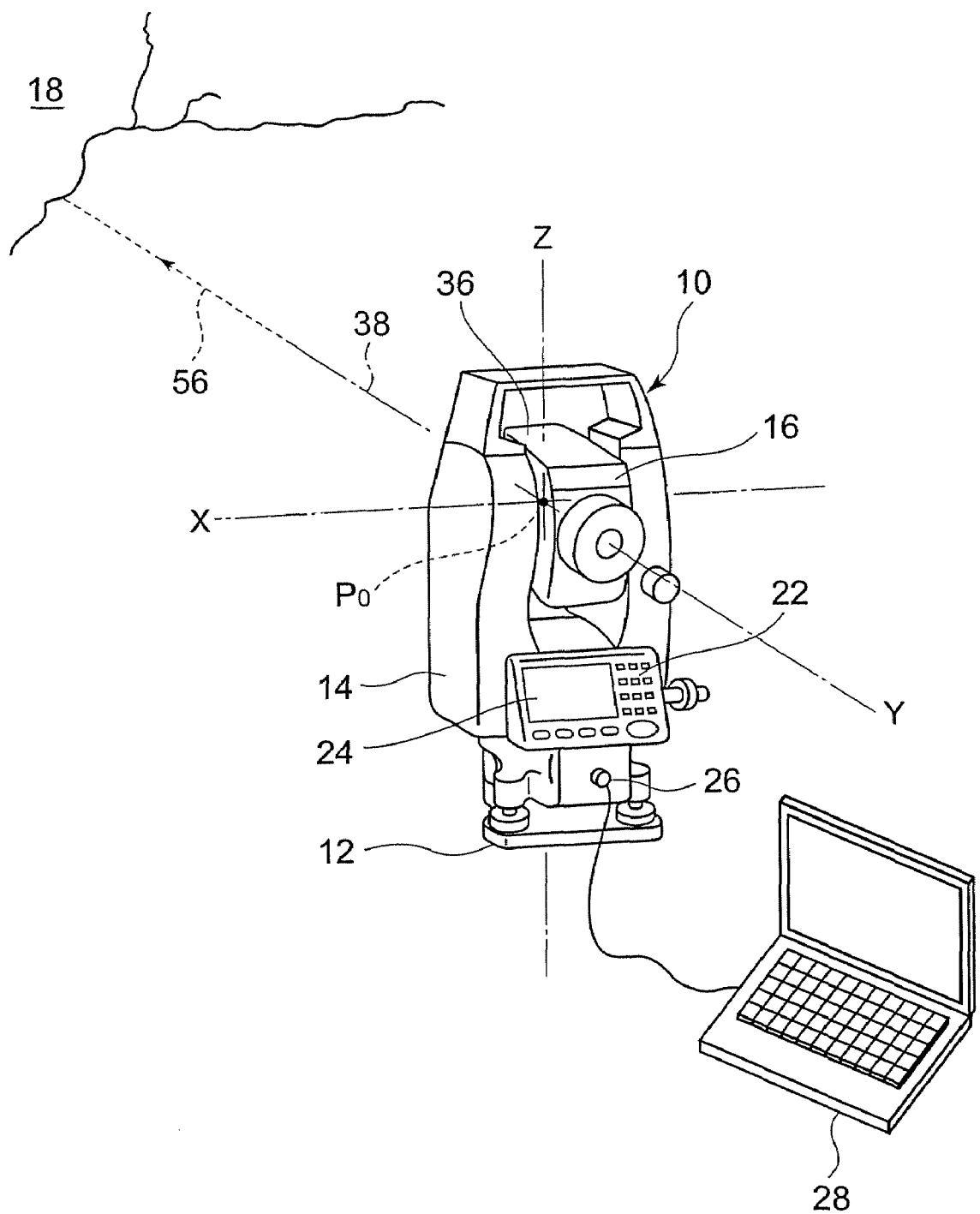
FIG. 1 is a perspective view showing a measuring device according to one embodiment of an optical apparatus of the present invention.

FIG. 1 shows a laser measuring device, or total station 10, exemplifying an optical apparatus according to the present invention. Similar to the conventional measuring device, the measuring device 10 has a base plate 12 adapted to be detachably secured to a tripod (not shown), a main body 14 coupled to the base plate 12 so as to rotate freely around a vertical axis (Z-axis), and a telescope 16 coupled to the main body 14 to rotate freely around a horizontal axis (X-axis). The measuring device 10 has a distance measuring means or unit indicated at 20 in FIG. 2 for measuring a distance between a reference point (reference coordinate or mechanical coordinate) $P_0$ which is an intersection of three axes including the perpendicular axis (Z-axis), the horizontal axis (X-axis), and the Y-axis that coincides with an optical axis 38 of the telescope 16 and an object 18 collimated by the telescope 16. In the embodiment, the measuring device 10 has an input unit 22 for inputting data required for distance measurements, a display unit 24 for displaying the results of distance measurements, for example, and an output unit 26 for outputting the data inputted from the input unit 22 and the data of the results of the measurements to other devices such as a computer 28.

Figure 2:
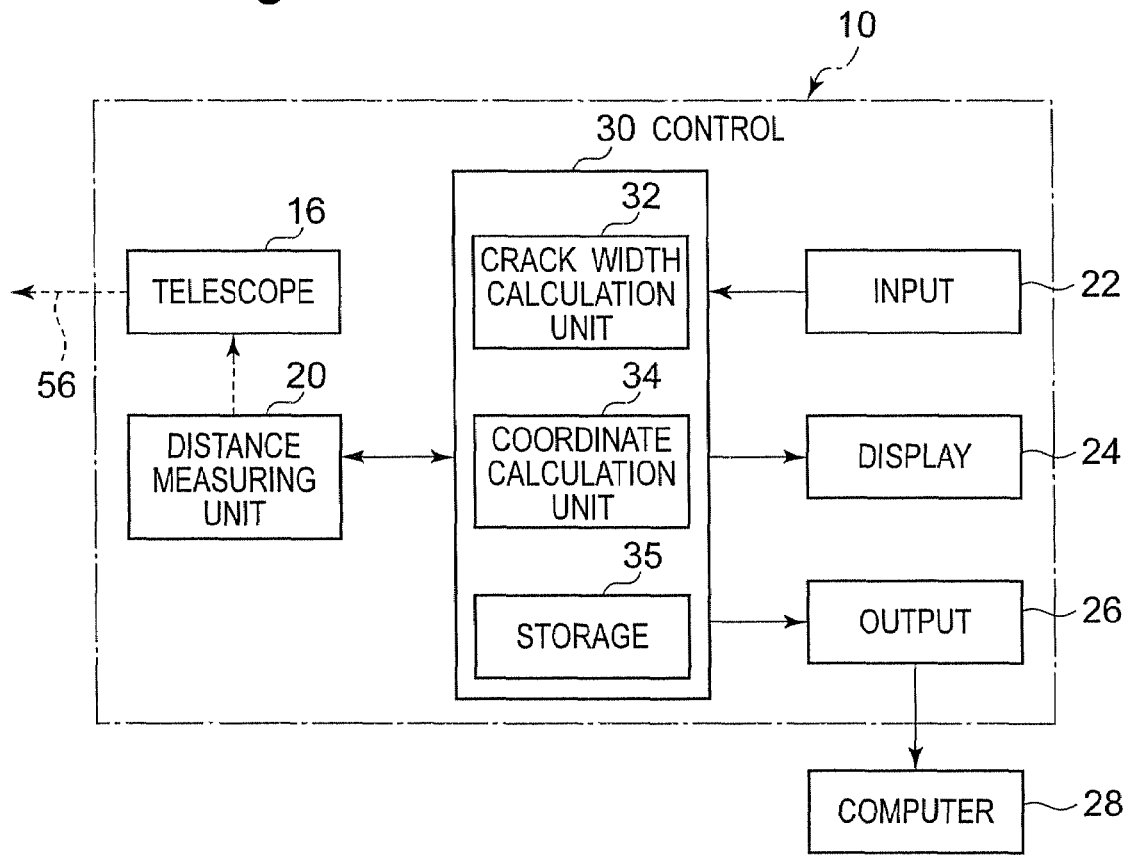
FIG. 2 is a block diagram showing a structure and functions of the measuring device shown in FIG. 1.

FIG. 2 is a functional block diagram showing the structure of the measuring device 10. As shown in the drawing, the measuring device 10 has a control unit 30. The control unit 30 is electrically connected to the distance measuring unit 20, the input unit 22, the display unit 24, and the output unit 26 to systematically control the units. The control unit 30 has a crack-width calculation unit 32 which calculates widths of cracks occurred, for example, in a concrete structure, a coordinate calculation unit 34 that calculates spatial coordinates of an object to be measured, for example, three-dimensional coordinates of the crack portion visually collimated by the telescope 16, and a storage unit 35 for storing programs and data required for the calculation of the coordinates and crack-width calculations. Although not shown in the drawing, the measuring device 10 has other elements or units required for the measurements, such as a leveling unit and an angle measuring unit.

1-2: Telescope

Figure 3:
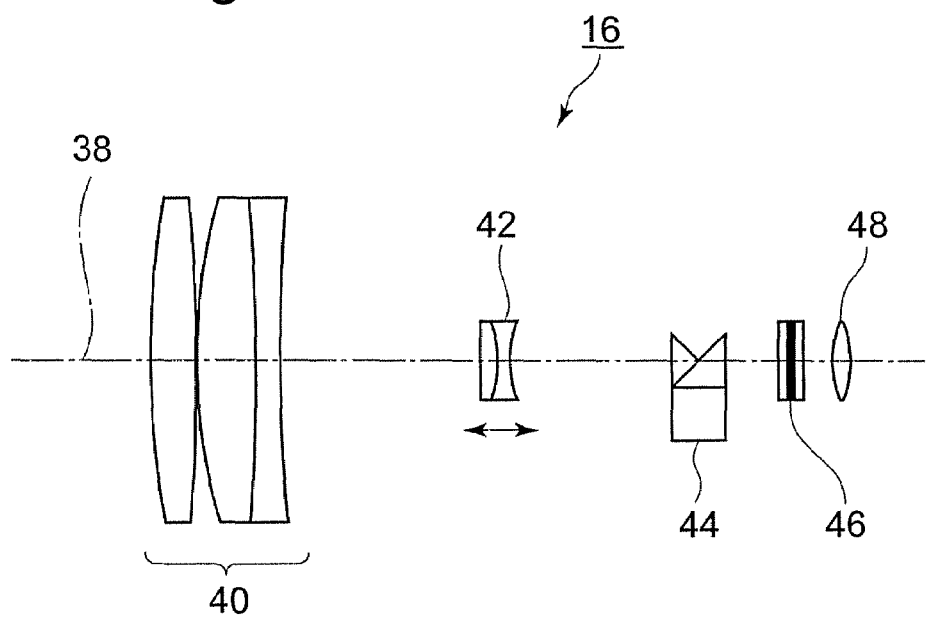
FIG. 3 is a cross-sectional view showing a schematic structure of a telescope of the measuring device shown in FIG. 1.

FIG. 3 shows a schematic structure of the telescope 16. As shown in the drawing, the telescope 16 has a lens-barrel, indicated by reference numeral 36 in FIG. 1, in which an objective lens 40, a focusing lens 42, an erect prism 44, a reticule plate 46, and an eye lens 48 are arranged in this order along the optical axis 38 from the object toward the operator, from left toward right in the drawing, so that the collimated object image such as the crack image is focused through the objective lens 40, the focusing lens 42 and the erect prism 44 on the focus lens 46, which allows the object image to be observed in an enlarged manner through the eye lens 48 by the operator.

1-3: Reticule Plate and Reference Scale

Figure 4:
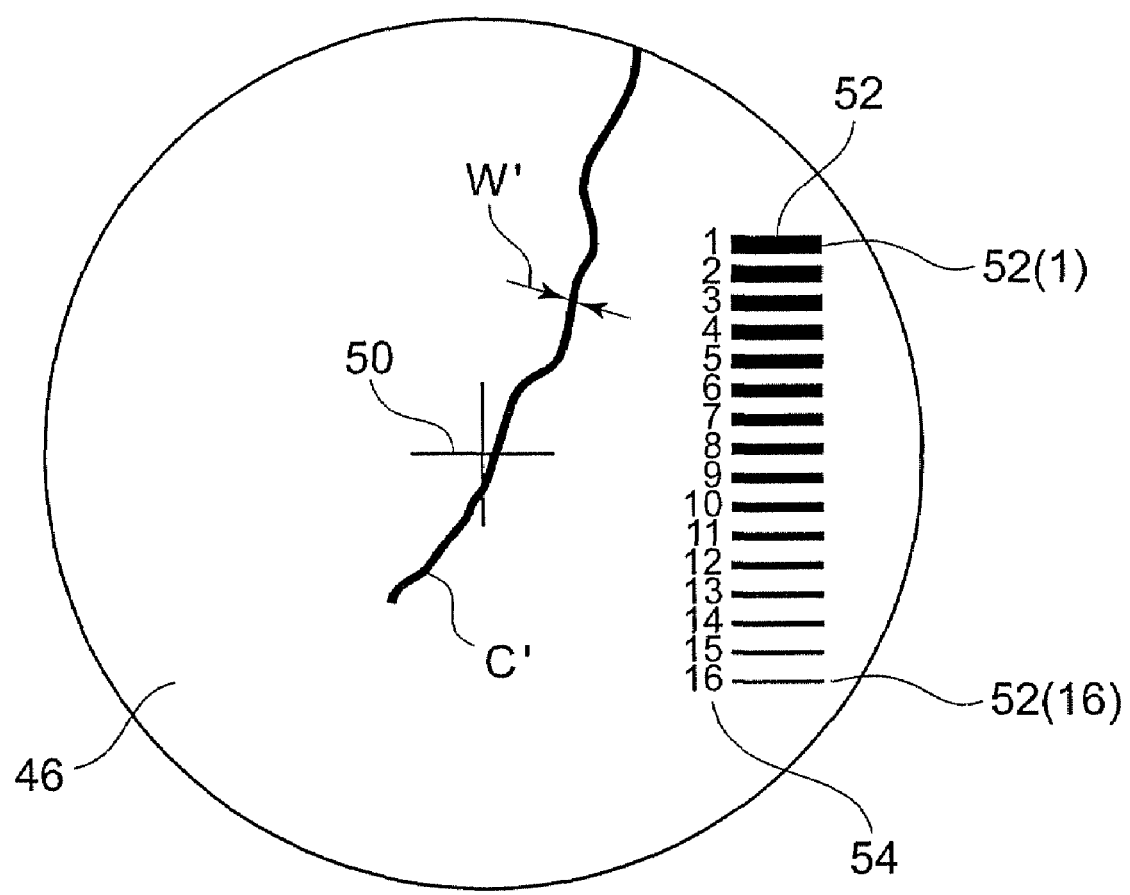
FIG. 4 is a diagram showing an object (crack) projected onto a reticule plate and a reference scale.

FIG. 4 shows cross hairs 50 for alignment and a plurality of marks or reference scales 52 indicated on the reticule plate 46, together with an object image or a crack image C' collimated on the reticule plate 46 and observed through the eye lens 48. The intersection of the cross hairs 50 coincides with the optical axis 38. In the embodiment, a number of reference scales 52, e.g., 16 scales, are provided in the circumferential regions of the reticule plate 46. The reference scales 52, each formed of a rectangular or strip-like mark having a smaller vertical dimension and a larger transverse dimension, are spaced apart from each other and arranged in line in the direction perpendicular to the optical axis. As shown in the drawing, the strip-like reference scales have the same transverse dimension. The strip-like reference scales have different vertical dimensions. Specifically, each of the reference scales has larger vertical dimension than that positioned thereunderneath so that the lowermost reference scale has the smallest vertical dimension and the uppermost reference scale has the largest vertical dimension.

In the embodiment, the second to uppermost reference scales 52 have respective vertical dimensions two to N (N: integer) times as large as that of the lowermost reference scale. Indicated beside the reference scales 52 are respective dimension indexes or numbers associated with the reference scales. For example, the dimension index "1" is provided beside the upper most reference scale 51(1) and the dimension index "16" is provided beside the lowermost reference scale 51(16). Alternatively, the dimension indexes 54 may be other symbols such as alphabets. The number of each dimension index relates to the vertical dimension of the associated reference scale 52 and a relationship between the dimension indexes 54 and the corresponding vertical dimensions is stored in the storing unit 35 in the form of table or the mathematical scheme. This allows that, using the dimension index of the reference scale obtained through the operator's visual comparison between the collimated object image and the reference scale having a dimension which is the same as or closest to that of the object image collimated on the reticule plate and then inputted through the input unit 22 into the measuring device 10, the measuring device 10 calculates the dimension of the object projected onto the reticule plate 46.

1-4: Distance Measuring Unit

Figure 5:
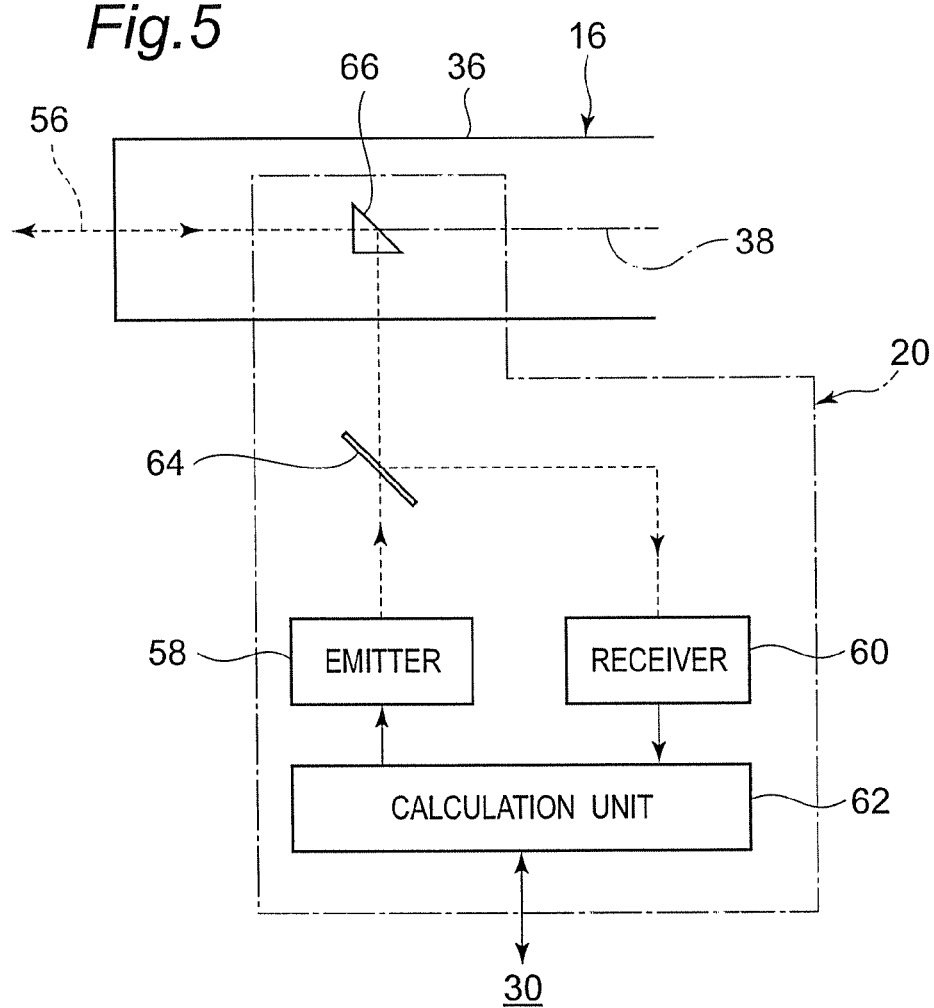
FIG. 5 is a block diagram showing a structure and functions of the measuring device shown in FIG. 2.

Referring to FIG. 5, the distance measuring unit 20 has a light emitter or laser device 58 made of a laser diode for emitting a laser beam, a light receiver 60 for receiving the laser beam reflected from the object such as crack, a calculation unit 62 for calculating a distance from the object to the reference point $P_0$ based on a time from the emission to the reception of the laser beam, and an optical system 64 for directing the laser beam emitted from the light emitter 58 along the optical axis 38 of the telescope 16 toward the object and then the laser beam from the object along the optical axis 38 to the light receiver 60. As shown in the drawing, a prism 66 is positioned inside the telescope 16 to form a part of the optical system 64 so that the laser beam 56 advances in a direction which coincides with the optical axis 38 of the telescope 16. The distance calculation in the laser distance measuring unit 20 is not limited to use the time from the emission to the receipt of the laser beam and, instead, it may be determined from a phase difference between the emitted and the received light beams.

1-5: Input Unit

Figure 6:
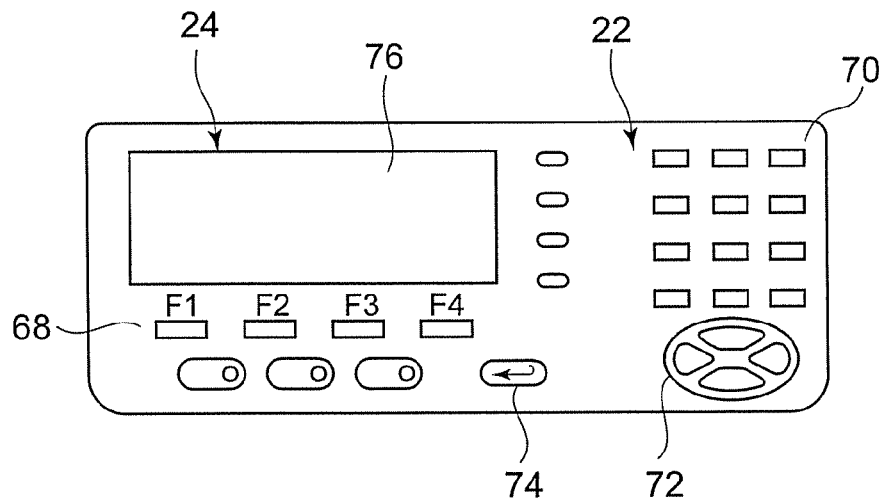
FIG. 6 is a diagram showing an input unit and a display unit shown in FIG. 1.

As shown in FIG. 6, the input unit 22 has a plurality of keys, for example, function keys 68, ten keys 70, cursor shift keys 72, and an enter key 74. The function keys 68 are utilized for instructing an execution of processes in the dimension measurements of cracks, which will be described later. The ten keys 70 are utilized for the input of the numbers obtained from the dimension indexes 54 on the reticule plate 46.

1-6: Display Unit

As shown in FIG. 6, the display unit 24 has a liquid crystal display 76. The liquid crystal display 76 displays numeric values such as distance and azimuth measured by the distance measuring unit 20, the number of the dimension index 54 inputted through the ken keys 70, the crack width calculated In the crack width calculation unit 32, the coordinate calculated in the coordinates calculation unit 34, the measurement results, and other information necessary for the operations.

1-7: Output Unit

As shown in FIG. 1, the output unit 26 outputs various information, including the measurement results to be displayed on the display unit 24, to the computer 28 connected thereto.

2-1: Basic Scheme of Calculation

A basic scheme of the method for calculating a width of the crack occurred in the surface of the concrete structure will be described below. To simplify the description, an environment is supposed in which a measuring device 10 is disposed at a higher position to observe a linear crack C with a fixed width W occurred on a horizontal surface Q such as a surface of the concrete structure Q located below the device 10. To facilitate the understanding of the calculation scheme, it should be noted that the crack C is illustrated in the drawing to have a substantially large width. In the drawing, longitudinal opposite edge lines of the crack C are indicated by $L_L$ and $L_R$, respectively. An inclined plane including one longitudinal edge line $L_L$ of the crack C and the reference point $P_0$ of the device 10, namely, a triangle plane defined by connecting three points $P_0$, $P_{L0}$, and $P_{L2}$, is indicated by $Q_0$. A perpendicular plane crossing the reference point $P_0$ and directing in the direction $D_1$, namely, a triangle plane defined by connecting three points $P_0$, $P_0'$, and $P_{L0}$, is indicated by $Q_1$. As shown in the drawing, point $P_0'$ is an intersection at which a perpendicular line crossing $P_0$ intersects the plane Q, and point $P_{L0}$ is a point on the longitudinal edge line $L_L$ at which the inclined plane $Q_0$ intersects the perpendicular plane $Q_1$. Also, point $P_{R0}$ is a point at which a line passing $P_{L0}$ crosses perpendicularly the other longitudinal edge line $L_R$.

Figure 7:
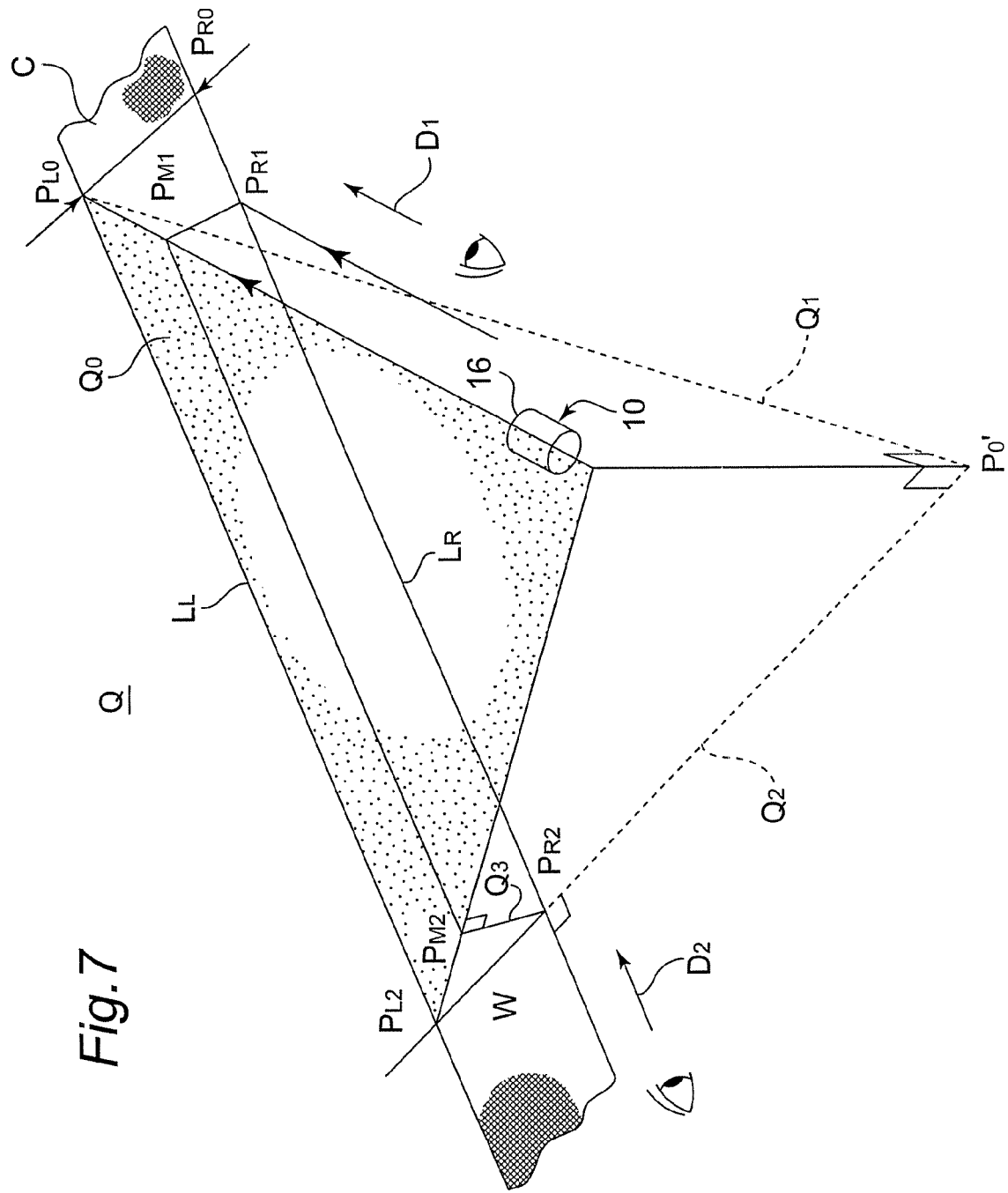
FIG. 7 is a diagram showing a principle based on which the object width or the crack width is measured.
Figure 8:
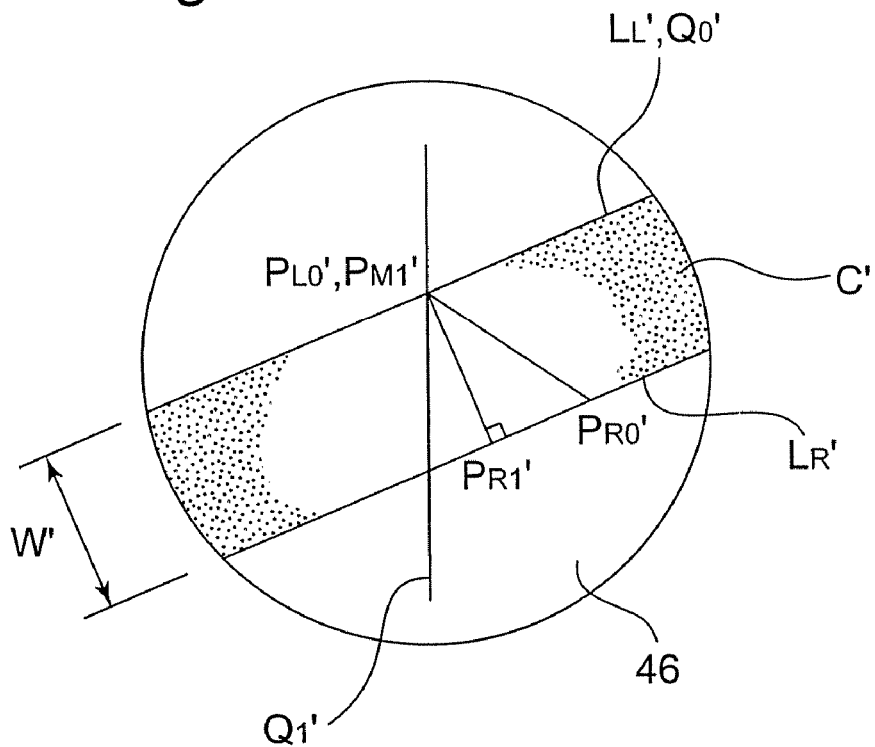
FIG. 8 is a diagram showing the crack image projected onto the reticule plate of the telescope.

FIG. 8 shows an image projected onto the reticule plate 46 of the telescope 16 of the measuring device 10 in this circumstance. In the drawing, C' indicates a projected image of the crack C, and W' indicates the width of the crack image C'. $P_{L0}'$, $P_{R0}'$, $P_{P1}'$ and $P_{M1}'$ respectively indicate projected points of points $P_L$, $P_{R0}$, $P_{P1}$, and $P_{M1}$ shown in FIG. 7. Lines $L_L'$ and $L_R'$ respectively indicate projected lines of the edge lines $L_L$ and $L_R$. $Q_0'$ and $Q_1'$ are lines corresponding to planes $Q_0$ and $Q_1$ shown in FIG. 7. As shown in the drawing, the line $Q_1'$ corresponding to the plane $Q_1$ diagonally crosses the crack image C' on the reticule plate 46. A projected line of the line connecting the points $P_{L0}$ and $P_{R0}$ which corresponds to the actual transverse width W of the crack C is the line that passes through the projected points $P_{L0}'$ and $P_{R0}'$ and diagonally crosses the crack image W'. It should be noted that, among lines shown in FIG. 8, lines other than $L_L'$ and $L_R'$, i.e., lines defining $Q_1'$, line connecting $P_{L0}'$ and $P_{R0}'$, and line connecting $P_{M1}'$ and $P_{R1}'$, are not observed actually on the reticule plate 46.

On the reticule plate 46, a line which corresponds to the transverse width W of the crack C is a line connecting points $P_{L0}'$ and $P_{R0}'$ and diagonally crossing the crack image C', but not a line connecting points $P_{L0}'$ and $P_{R1}'$ and perpendicularly crossing the crack image C'. As shown in FIG. 7, the line perpendicularly crossing the crack image C' is a line obtained by projecting the line connecting $P_{R1}$ and $P_{M1}$, wherein $P_{R1}$ is a certain point on the longitudinal edge line $L_R$ and $P_{M1}$ is a point where a perpendicular line passing through $P_{R1}$ perpendicularly crosses the inclined plane $Q_0$. According to the invention in which the transverse width of the actual crack is determined by using the transverse width of the crack image projected on the reticule plate 46, the transverse width W' of the crack image on the reticule plate 46, observed by the operator, corresponds to the length of the perpendicular line.

As shown in FIG. 7, supposed is a triangle, perpendicular plane $Q_2$ which includes $P_0$ and $P_0'$ and perpendicularly crosses the crack C. As shown, $P_{L2}$ and $P_{R2}$ are the points where the perpendicular plane $Q_2$ crosses the longitudinal edge lines $L_L$ and $L_R$, respectively. Also supposed is a rectangular plane $Q_3$ including the longitudinal edge line $L_R$ and the perpendicular line connecting $P_{R1}$ and $P_{M1}$. A line on which the planes $Q_2$ and $Q_3$ cross with each other is defined by the perpendicular line connecting $P_{M2}$ and $P_{R2}$. The perpendicular line connecting $P_{M2}$ and $P_{R2}$ is in parallel to and has the same dimension as the perpendicular line connecting $P_{M1}$ and $P_{R1}$. According to this relationship, the actual transverse width W of the crack C is obtained from the length W" which is the length of the perpendicular line connecting $P_{M2}$ and $P_{R2}$ and obtained by using the width W' of the crack image C'.

2-2: Calculation of Crack Width "W"

The length W" of the perpendicular line is substantially in proportion to the multiplication of the width W' of the crack image produced on the reticule plate 46 and the length L from the reticule plate 46 to the crack C, which is provided by the following Equation (1):

$$W'' = \alpha \cdot L \cdot W' \tag{1}$$

In the Equation, the coefficient $\alpha$ is a constant for the optical system of the telescope and is determined by the magnification of the objective lens. The distance L from the object, for example, crack, to the reticule plate is obtained based on the distance measurement result obtained by the distance measuring unit. Specifically, in the measuring device 10, a distance $\Delta L$ from the reference point $P_0$ to the reticule plate 46 is given. The distance $L_0$ from the reference point $P_0$ to the crack is determined by the distance measuring unit 20. Using the distances $\Delta L$ and $L_0$, the crack width calculation unit 32 calculates the distance L $(=L_0+\Delta L)$ from the object to the reticule plate.

The width W' of the crack image C' projected on the reticule plate 46 is obtained from the dimension index, i.e., number "1"-"16", inputted by the operator through the input unit 22. More specifically, the relationship between the dimension index indicated on the reticule plate 46 and the actual dimension in the longitudinal direction is stored in the storage unit 35 in the form of table or equation(s). The operator visually compares the width W' of the crack image C' projected on the reticule plate with the reference scales and then inputs the dimension index of the reference scale having the same dimension (longitudinal dimension) as or closest to that of the width W' through the input unit 22. The crack width calculation unit 32 calculates the width W' of the crack image on the reticule plate 46 based upon the table or the relational equation in the storage unit 35. For example, when the operator inputs a dimension index "10" through the input unit 22, the crack width calculation unit 32 calculates the width of the actual crack image as "5 μm".

It should be noted that the Equation 1 is an ideal Equation in which the perpendicular length W" is supposed to be proportional to the width W' of the crack image C' and also to the distance L from the reticule plate 46 to the crack; however, since an actual optical system contains various aberrations, the following Equation 2, obtained by transforming the Equation 1, is used for the actual calculations. Preferably, coefficients $\alpha_1$ and $\alpha_2$ in the Equation 2 are determined through experiments.

$$W'' = (\alpha_1 \cdot L + \alpha_2) W' \tag{2}$$

Figure 9:
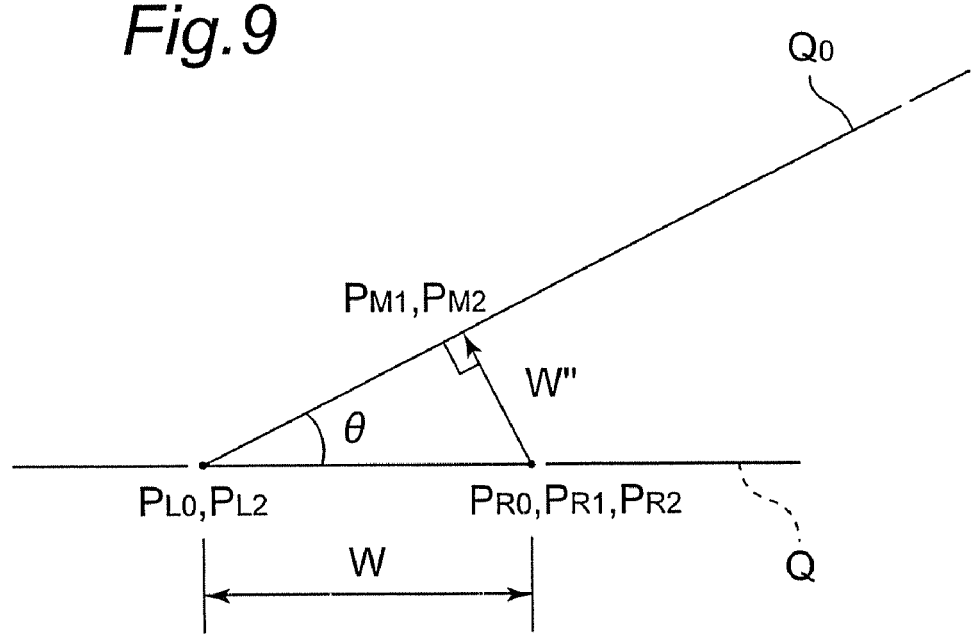
FIG. 9 is a diagram showing a relationship of the crack width, the crack image width, and the angle.

As shown in FIG. 9, the perpendicular length W" and the width W of the crack C have a relationship given by the following Equation 3.

$$W'' = W \cdot \sin \theta \tag{3}$$

For example, as shown in FIG. 7, the angle $\theta$ is an intersection angle between a line connecting $P_0$ and $P_{L2}$ and a line connecting $P_0'$ and $P_{L2}$ or between planes Q and $Q_0$. A method for determining the angle $\theta$ will be described later.

Following Equation 4 is obtained from Equations 2 and 3.

$$W'' = \frac{(\alpha_1 \cdot L + \alpha_2)W'}{\sin\theta} \quad (4)$$

The coefficients $\alpha_1$ and $\alpha_2$ can be determined, for example, as follows. First, a plurality of marks having different dimensions or difference widths W' in the form of rectangular, for example, are indicated on a wall. The widths W ($W_1 \ldots W_n$) (n: number of marks) of the marks are measured. Next, the measuring device is provided to measure respective distances L ($L_1 \ldots L_n$) from the measuring device (reference point $P_0$) to respective marks. Also, the dimensions (dimension indexes) W' ($W_1' \ldots W_n'$) of the marks projected on the reticule plate are read. Further, the angles $\theta$ are obtained for respective marks. The obtained four values, i.e., L, W, W' and $\theta$ are processed statistically by using least square method, for example, to determine the coefficients $\alpha_1$ and $\alpha_2$.

Alternatively, a mark having a predetermined dimension or width W is indicated on the wall. The distance L ($L_1 \ldots L_n$) from the wall to the measuring device is varied. For each distance, the dimensions of the dimension index W' ($W_1' \ldots W_n'$) is read. The resultants L, W, W' and $\theta$ are statistically processed to determine the coefficients.

Alternatively, a plurality of marks are indicated at the same place on a wall surface one after another while maintaining the distance L and the angle $\theta$. Then, the coefficients $\alpha_1$ and $\alpha_2$ can be obtained from the relationship between the widths W and W'. The coefficients $\alpha_1$ and $\alpha_2$ thus calculated are stored in the storage unit 35.

In place of Equation 4, following Equation 5 may be used in which a correction constant $\alpha_3$ is added.

$$W'' = \frac{(\alpha_1 \cdot L + \alpha_2)W'}{\sin\theta} + \alpha_3 \quad (5)$$

The constant $\alpha_3$ is determined by taking inherent mechanical errors for the optical system into consideration.

2-3: Calculation of Angle $\theta$

Figure 10:
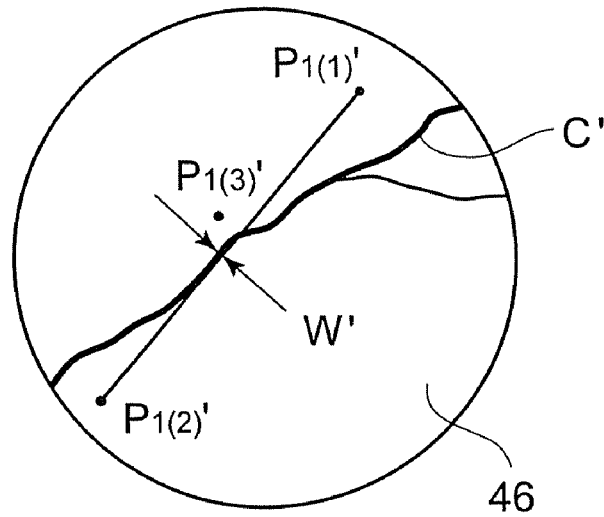
FIG. 10 is a diagram showing s the crack projected onto the reticule plate of the telescope, an extended line (hypothetical line), and a measuring point.
Figure 11:
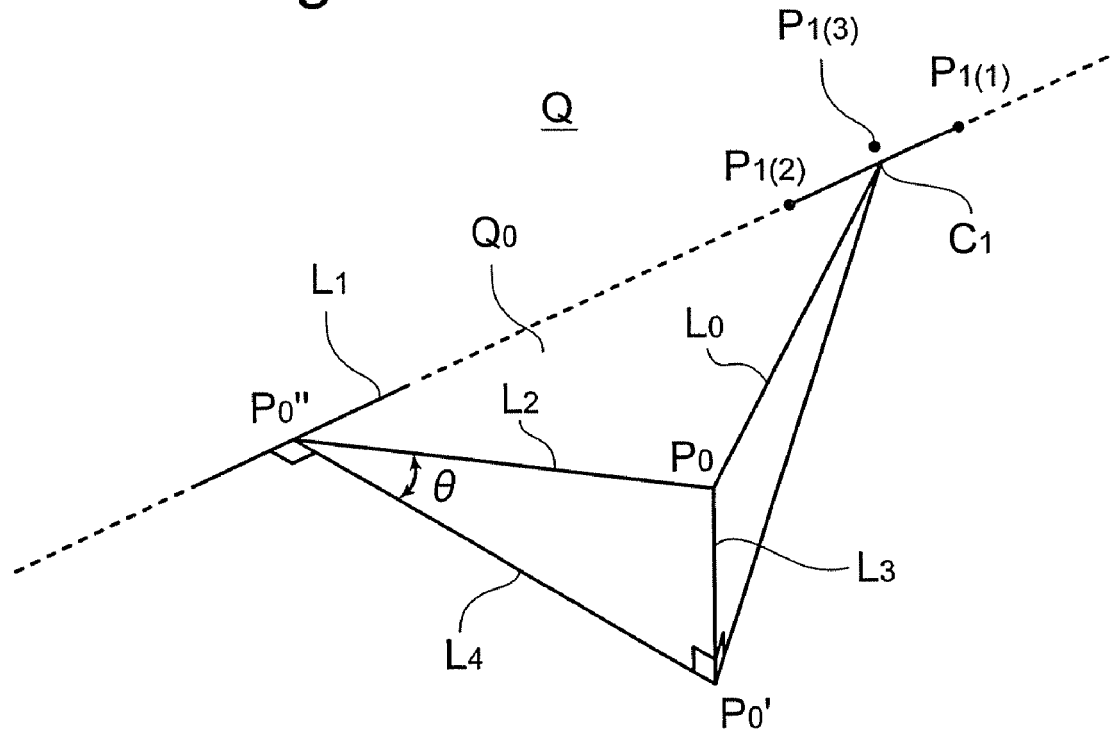
FIG. 11 is a diagram showing a measuring method for the angle.

As shown in FIG. 1, typically the crack advances in difference directions, i.e., windingly, in the surface of the concrete structure. Therefore, as shown in FIG. 11, when measuring the actual crack width, supposed is an extended line $L_1$ of the crack portion $C_1$ of the crack which is projected on the reticule plate 46 and where the crack width will be measured. The extended line $L_1$ is a line which extends in a direction orthogonal to the transverse direction of the crack portion $C_1$ to be measured. Practically, the extended line $L_1$ can be obtained by determining two points supposed to exist on the extended line $L_1$ and positioned on the surface. In the drawing, the determined two points are indicated by $P_{1(1)}$ and $P_{1(2)}$. As will be described later, a third point $P_{1(3)}$, located adjacent the crack portion $C_1$, is also determined so as to define a function of the concrete surface plane on which the crack portion $C_1$ exists. In FIG. 10, $P_{1(1)}'$, $P_{1(2)}'$ and $P_{1(3)}'$ are indicated, each corresponding to the points $P_{1(1)}$, $P_{1(2)}$ and $P_{1(3)}$.

Using the measuring device, respective coordinates ($x_1$, $y_1$, $z_1$), ($x_2$, $y_2$, $z_2$) and ($x_3$, $y_3$, $z_3$) of the three points $P_{1(1)}$, $P_{1(2)}$ and $P_{1(3)}$ are determined. At this time, the measuring device determines those coordinates using the coordinate of the reference point $P_0$, diagonal distances from the reference point to the respective points, and azimuths of the directions from the reference point toward the respective points.

Using the coordinates ($x_1$, $y_1$, $z_1$) and ($x_2$, $y_2$, $z_2$) of the two points $P_{1(1)}$ and $P_{1(2)}$, the function of the extended line $L_1$ is determined. For example, the extended line $L_1$ is determined by the following Equation 6:

$$\frac{x - x_1}{k_1} = \frac{y - y_1}{k_2} = \frac{z - z_1}{k_3} \quad (6)$$

wherein $k_1 = x_2 - x_1$, $k_2 = y_2 - y_1$, and $k_3 = z_2 - z_1$.

The function of the concrete plane surface is defined, for example, by the following Equation 7, using the coordinates ($x_1$, $y_1$, $z_1$), ($x_2$, $y_2$, $z_2$) and ($x_3$, $y_3$, $z_3$) of the three points $P_{1(1)}$, $P_{1(2)}$ and $P_{1(3)}$:

$$m_1(x-x_1)+m_2(y-y_1)+m_3(z-z_3) \quad (7)$$

wherein $m_1 = (y_2-y_1)(z_3-z_1)-(y_3-y_1)(z_2-z_1)$, $m_2 = (z_2-z_1)(x_3-x_1)-(z_3-z_1)(x_2-x_1)$, and $m_3 = (x_2-x_1)(y_3-y_1)-(x_3-x_1)(y_2-y_1)$.

Determined next are the function of a perpendicular line $L_2$ drawn downward from the reference point $P_0$ ($x_0$, $y_0$, $z_0$) to the extended line $L_1$ and the coordinates $P_0''$ ($x_0''$, $y_0''$, $z_0''$) of an intersection between the extended line $L_1$ and the perpendicular line $L_2$. The coordinate $P_0''$, which is on the extended line $L_1$, defines the minimum distance between the reference point $P_0$ and the extended line $L_1$. Then, the perpendicular line $L_2$ is determined as a function of line connecting between $P_0''$ and $P_0$. For example, the perpendicular line $L_2$ is defined by the following Equation 8:

$$\frac{x - x_0}{k_4} = \frac{y - y_0}{k_5} = \frac{z - z_0}{k_6} \quad (8)$$

wherein $k_4 = x_0'' - x_0$, $k_5 = y_0'' - y_0$, and $k_6 = z_0'' - z_0$.

Determined next are the function of the perpendicular line $L_3$ drawn downward from the reference point $P_0$ ($x_0$, $y_0$, $z_0$) to the plane Q and the coordinates $P_0'$ ($x_0'$, $y_0'$, $z_0'$) of an intersection $P_0'$ between the plane Q and the perpendicular line $L_3$. The coordinates $P_0'$, which is on the plane Q, defines minimum distance between the reference point $P_0$ and the plane Q. Then, the perpendicular line $L_3$ is defined as a function of line connecting between $P_0'$ and $P_0$. For example, the perpendicular line $L_3$ is defined by the following Equation 9:

$$\frac{x - x_0}{k_7} = \frac{y - y_0}{k_8} = \frac{z - z_0}{k_9} \quad (9)$$

wherein $k_7 = x_0' - x_0$,
$k_9 = z_0' - z_0$.
$k_8 = y_0' - y_0$, and

Determined next is a function of perpendicular lina $L_4$ which connects between $P_0'$ ($x_0'$, $y_0'$, $z_0'$) and $P_0''$ ($x_0''$, $y_0''$, $z_0''$). For example, the perpendicular line $L_4$ is defined by the following Equation 10:

$$\frac{x-x_0}{k_{10}} = \frac{y-y_0}{k_{11}} = \frac{z-z_0}{k_{12}} \tag{10}$$

wherein $k_{10} = x'_0 - x_0$, $k_{11} = y'_0 - y_0$, and $k_{12} = z'_0 - z_0$.

Determined next is the angle $\theta$ between the perpendicular lines $L_2$ and $L_4$. The angle $\theta$ is an angle between the line connecting $P_0$ and $P_0''$ and the line connecting $P_0''$ and $P_0'$ and therefore is determined by the coordinates of $P_0$, $P_0''$, and $P_0'$.

2-4: Measurement of Crack Width

Figure 12:
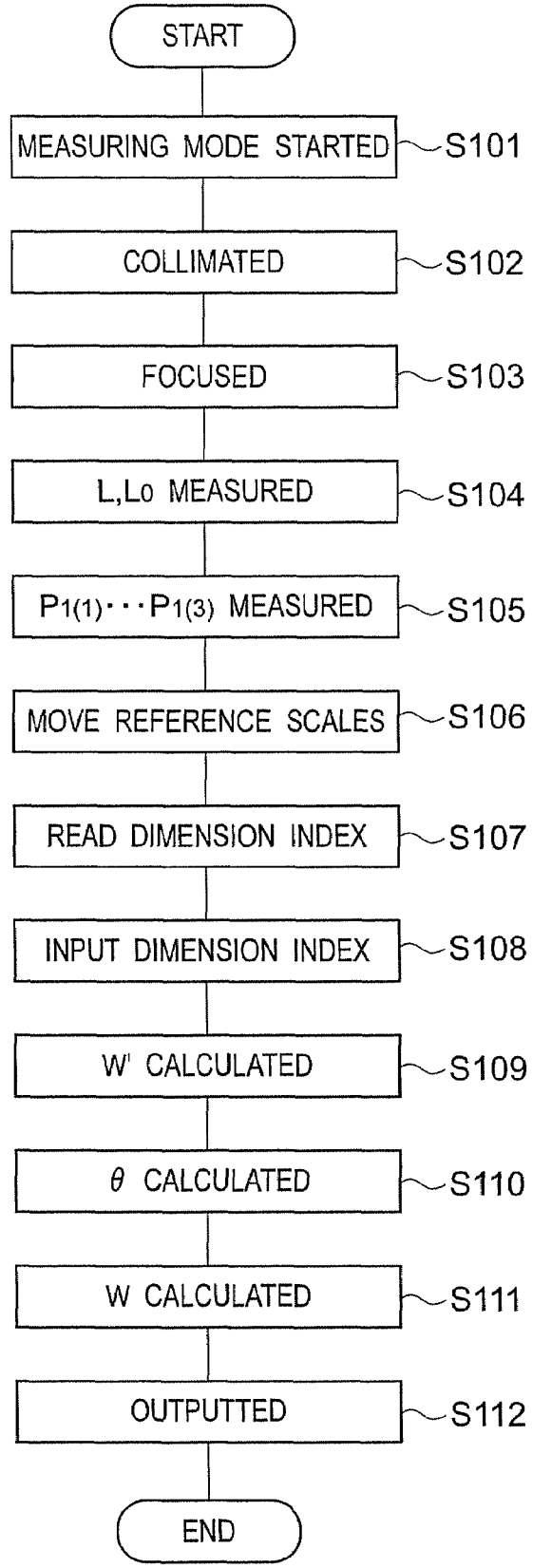
FIG. 12 is a flow chart showing processes used for determining the crack width.

Referring to FIG. 12, a detail discussion will be made to the measurement of crack width occurred in the surface of the concrete structure.

At step S101, a crack width measuring mode key or function key on the input unit 22 is pressed. This generates a turn-on signal by which the control unit 30 starts a crack width measuring mode.

At step S102, as shown in FIG. 11, the crack portion $C_1$ is collimated by the telescope 16.

At step S103, the focusing lens 42 is adjusted so that the image of the crack portion $C_1$ is properly collimated on the reticle plate 46.

At step S104, a distance measuring key or function key on the input unit 22 is pressed. This generates a turn-on signal by which the distance measuring unit 20 is energized to measure the distance $L_0$ from the reference point $P_0$ to the crack portion $C_1$. The measured distance $L_0$ is stored in the storage unit 35. Instead of or together with the distance $L_0$, the distance L from the reticle plate to the crack is calculated using the distance $L_0$ and $\Delta L$ and then is preferably stored in the storage unit 35.

At step S105, the extended line $L_1$ of the crack portion $C_1$ is supposed on the plane Q or the concrete surface. Then, the telescope is collimated at two points $P_{1(1)}$ and $P_{1(2)}$ on the extended line $L_1$ and the point $P_{1(3)}$ adjacent the crack portion $C_1$ to determine their coordinates $(x_1, y_1, z_1)$, $(x_2, y_2, z_2)$ and $(x_3, y_3, z_3)$, respectively. The coordinates thus measured are stored in the storage unit 35.

At step S106, the telescope 16 is rotated horizontally and/or vertically to place the reference scales 52 adjacent or on the projected crack image C'.

At step S107, the dimension index of the reference scale 52 having the same size as or closest size to that of the crack image C' is read.

At step S108, the read dimension index 54 is inputted through the input unit 22.

At step S109, the crack width calculation unit 32 of the control unit 30 calculates the width W' of the crack image C' projected on the reticle plate 46, based upon the inputted dimension index and the table or relational formula in the storage unit 35. The width W' thus calculated is stored in the storage unit 35.

At step S110, the crack width calculation unit 32 also calculates the angle $\theta$, based upon the coordinates of $P_0$, $P_{1(1)}$, $P_{1(2)}$, and $P_{1(3)}$.

At step S111, the crack width calculation unit 32 calculates the width W of the crack C by using the distance L, the coefficients $\alpha_1$ and $\alpha_2$, and the crack image width W'.

At step S112, the crack width W thus calculated is displayed on the liquid crystal display of the display unit 24.

When the output unit 26 is connected to the computer 28, the crack width W is transmitted to the computer 28.

3: Modified Embodiments

Although the foregoing discussion has been focused on the dimension measuring device according to the present invention, it should be understood that various modifications may be made therein within the scope of the present invention defined in the claims.

The above description is made to the method for calculating the crack width in which the optical axis 38 of the measuring device 10 diagonally intersects with the wall having the crack to be measured. In this method, even when the optical axis does not perpendicularly intersect the wall, the crack width may be calculated by using the following simplified Equation 11:

$$W = (\alpha_1 L + \alpha_2) W' + \alpha_3 \tag{11}$$

Also, the crack width calculation unit may be installed in an external unit connected to the output unit 26 of the measuring device 10, for example, in a computer 28. In this instance, based upon the program stored in the computer 28, the computer 28 may calculate the crack width according to the above-described calculation processes. The measurement results including the distance from the reference point to the object in the distance measuring unit 20 are transmitted from the measuring device 10 to the computer 28. Also, the number of the dimension index of the reference scale 52 may be directly inputted to the computer 28. The computer 28 calculates the size of the object image by using the table or equation indicating the relationship between the dimension index and the dimensions of the object, according to the above-described calculation processes. Then, the actual dimension of the object is calculated from the dimension of the object image and the distance therefrom.

Figure 13:
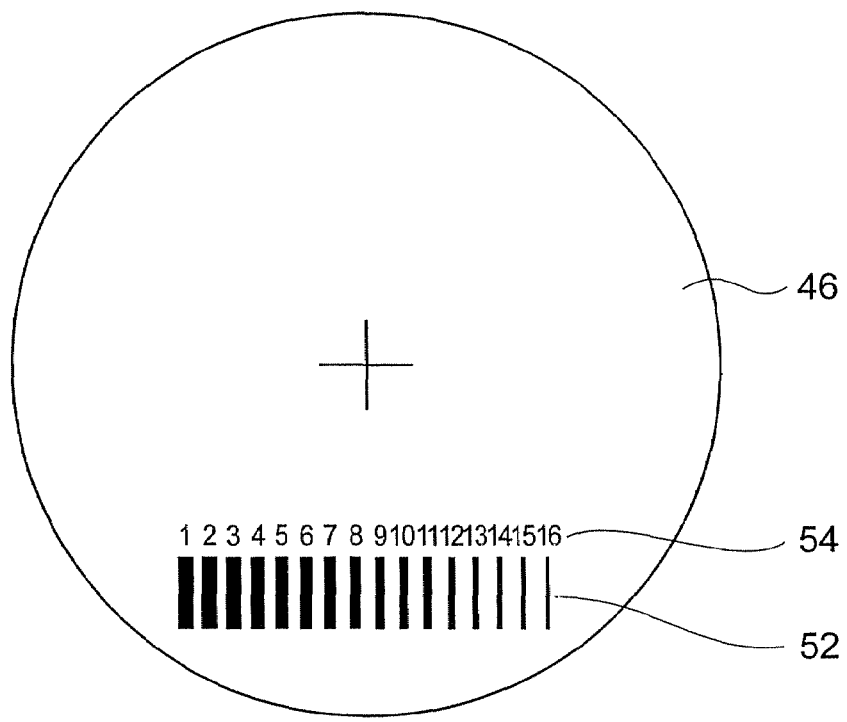
FIG. 13 is a diagram showing another embodiment of the reference scales and a dimension indexes formed on the reticule plate.
Figure 14:
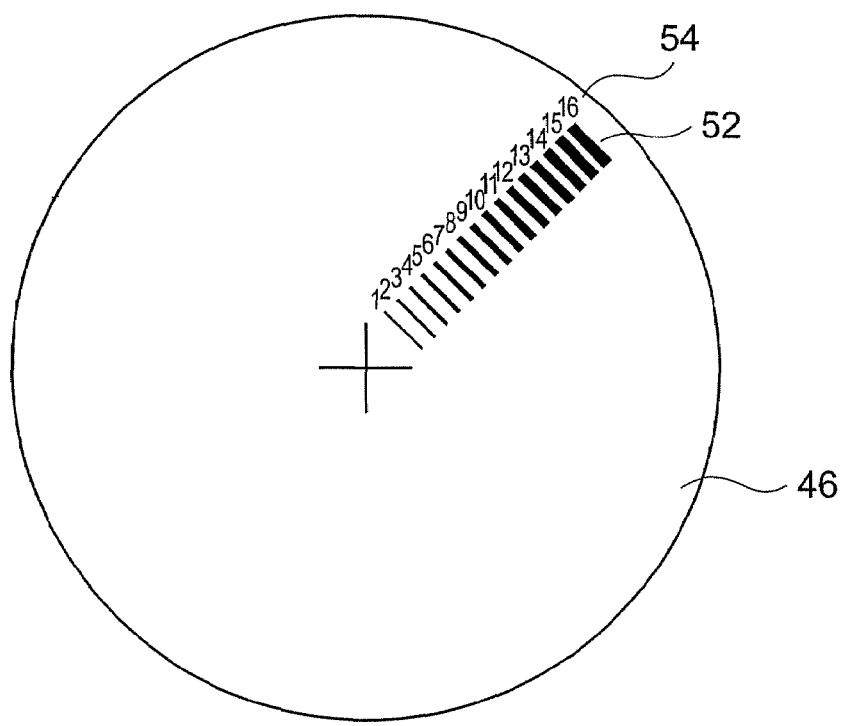
FIG. 14 is a diagram showing still another embodiment of the reference scales and dimension indexes formed on the reticule plate.
Figure 15:
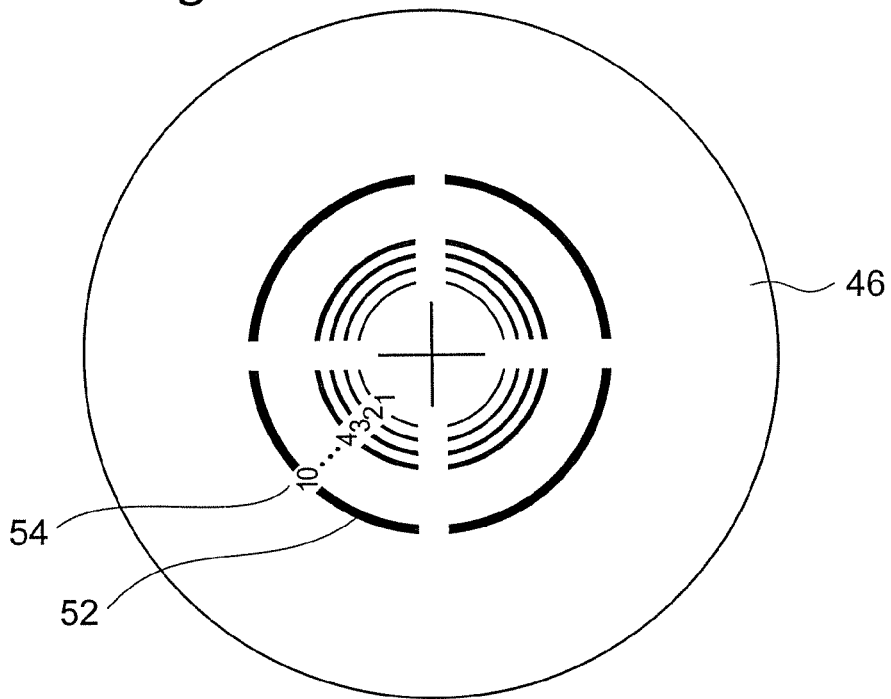
FIG. 15 is a diagram showing still another embodiment of the reference scales and dimension indexes formed on the reticule plate.
Figure 16:
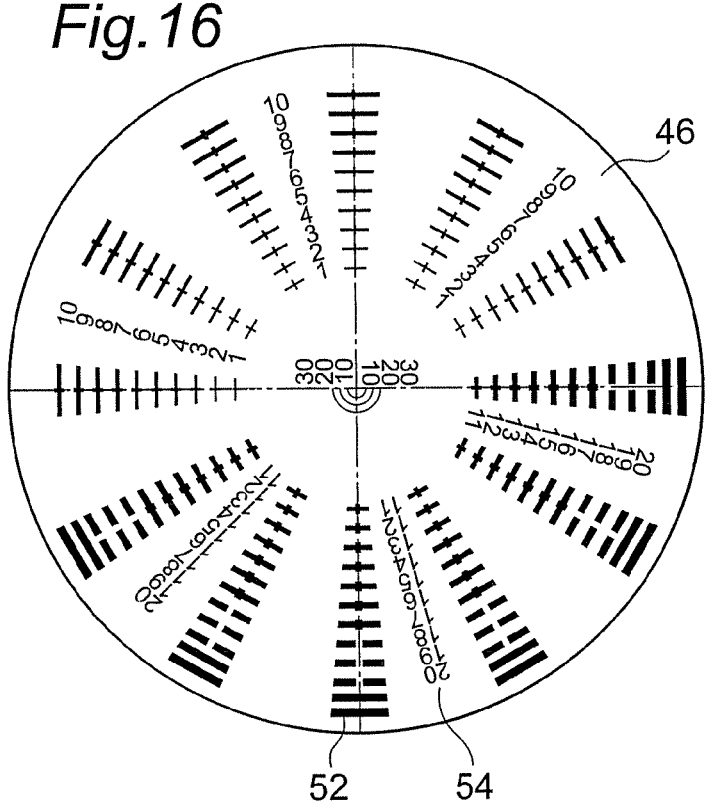
FIG. 16 is a diagram showing still another embodiment of the reference scales and dimension indexes formed on the reticule plate.
Figure 17:
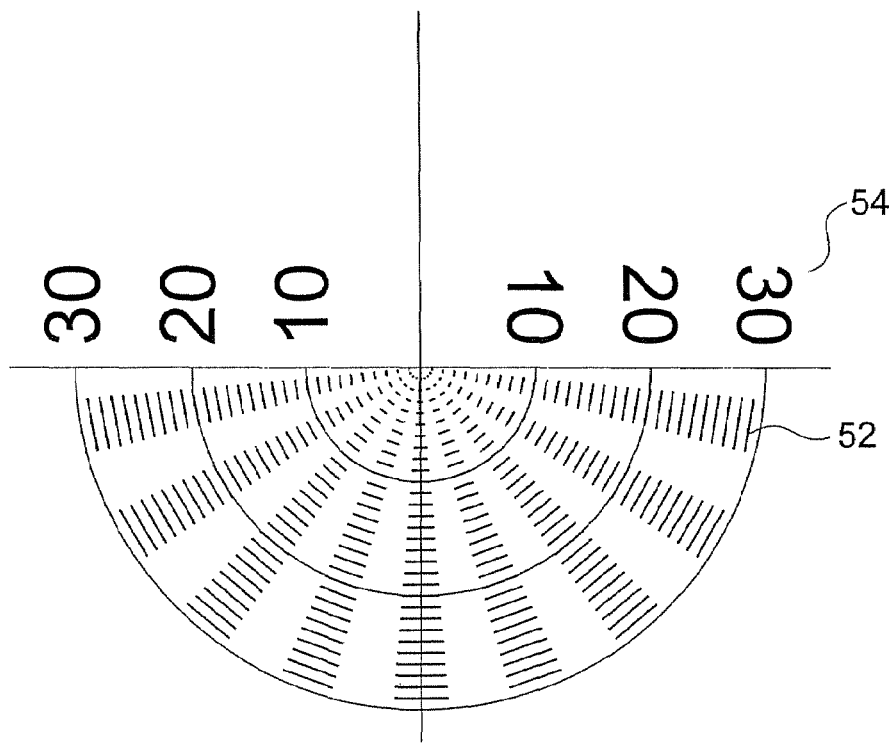
FIG. 17 is a diagram showing still another embodiment of the reference scales and dimension indexes formed on the reticule plate.
Figure 18:
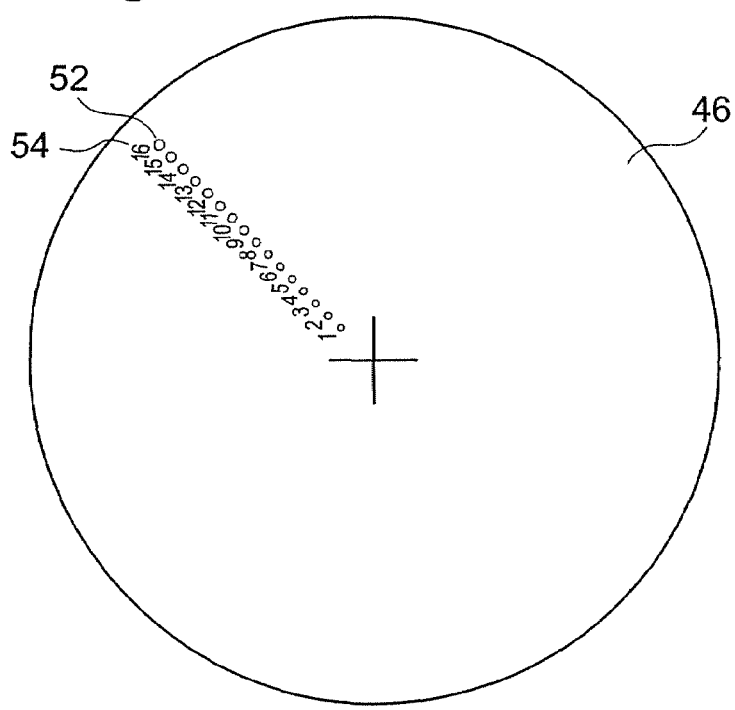
FIG. 18 is a diagram showing still another embodiment of the reference scales and dimension indexes formed on the reticule plate.
Figure 19:
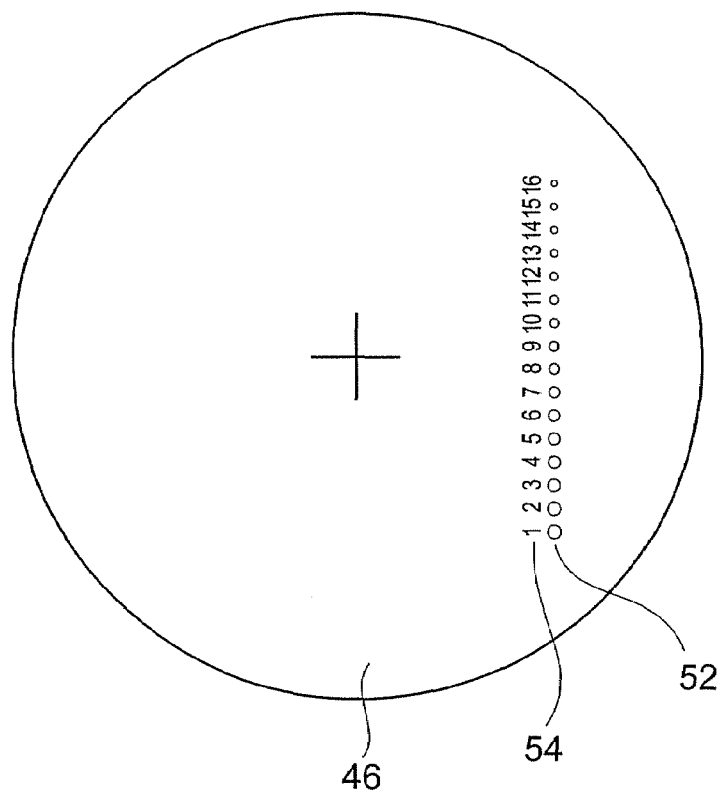
FIG. 19 is a diagram showing still another embodiment of the reference scales and dimension indexes formed on the reticule plate.

The shape and arrangement (e.g., place, direction) of the reference scales are not intended to be limited by the embodiment shown in FIG. 4. For example, in an embodiment shown in FIG. 13, the reference scales are aligned laterally, and numeric values of the dimension indexes corresponding to the reference scales are placed on respective reference scales. In an embodiment shown in FIG. 14, the reference scales are aligned in radial directions with respect to the optical axis. In an embodiment shown in FIG. 15, each of the reference scales is extended in the circumferential direction around the optical axis. Although each of the reference scales is in the form of circle, it may be a part of the circle extending circumferentially in a sector form. In an embodiment shown in FIG. 16, the reference scales with smaller widths are placed in radial directions on an upper region on the reticle plate, and the reference scales with larger widths are placed in radial directions on a lower region on the reticle plate. In an embodiment shown in FIG. 17, a plurality of reference scales each having the same width are prepared with dimension indexes arranged, for example, in a horizontal direction orthogonal to the optical axis. In embodiments shown in FIGS. 18 and 19, each of the reference scales is indicated by a solid or hollow circle.

Figure 20:
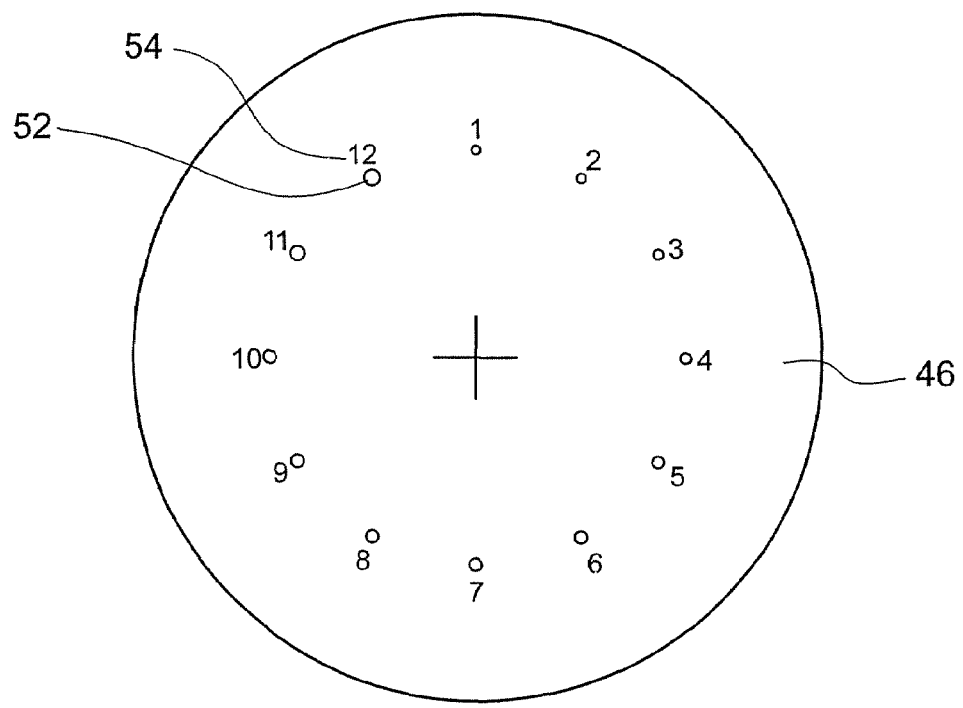
FIG. 20 is a diagram showing still another embodiment of the reference scales and dimension indexes formed on the reticule plate.
Figure 21:
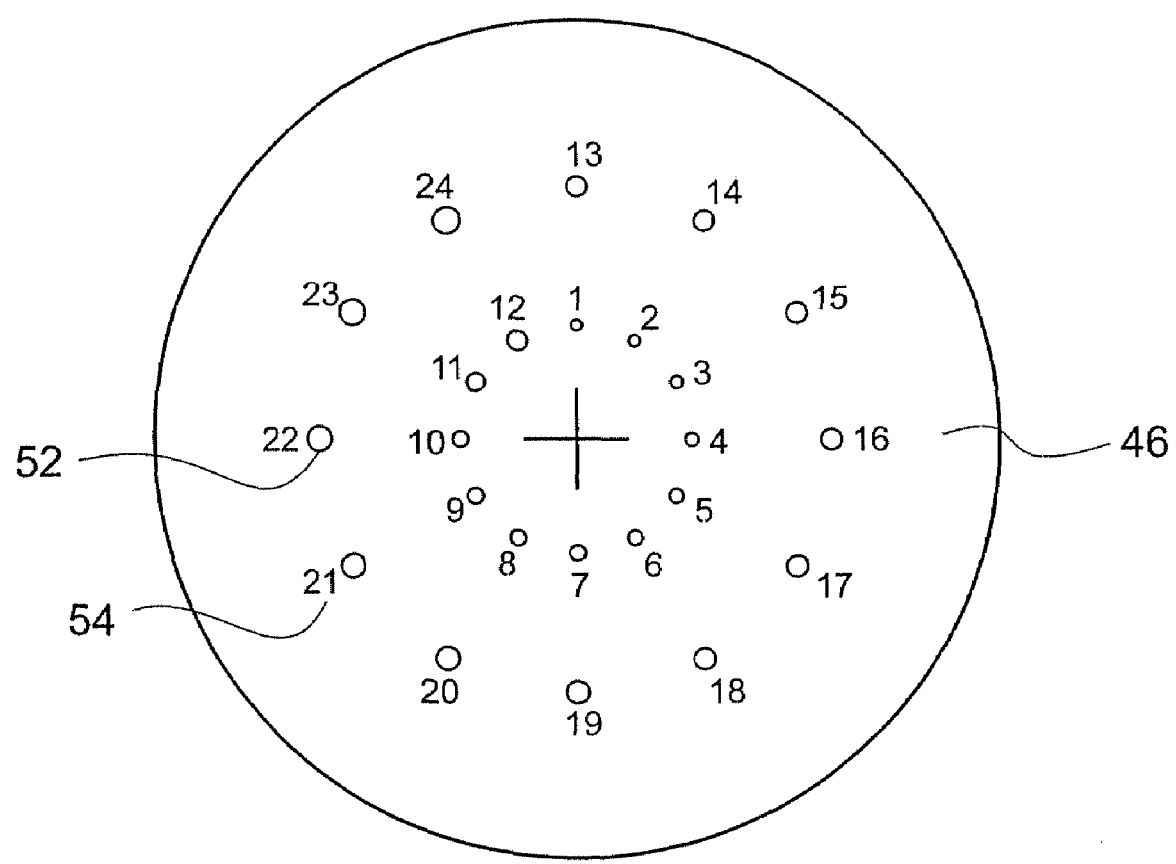
FIG. 21 is a diagram showing another embodiment of the reference scales and dimension indexes formed on the reticule plate.

As described above, the shapes and the arrangement directions of the reference scales can be freely modified so that the size of the object image projected on the reticle plate can be easily read. Also, by placing two or more reference scale arrangements, the movement of the telescope can be minimized. In embodiments shown in FIGS. 20 and 21, reference scales, each indicated as a solid circle or a hollow circle, are placed preferably at regular intervals on one or circumferential lines extending around the optical axis.

The distance measuring means is not limited to the distance measuring unit using a laser, and it may be, for example, an ultrasonic wave distance measuring unit using ultrasonic waves.

Although the dimension indexes of the dimension scales are inputted through the input unit in the above-described embodiment, the dimension of the object may be obtained by preparing a table showing a relationship between the dimension indexes and the dimensions of the object images and then inputting the dimension of the object image obtained from the table through the input unit.

Also, although the reference scales are provided on the reticule plate, they may be indicated on a transparent plate positioned on the front or rear side of the reticule plate with respect to the optical axis direction and within the focal depth of the eye lens, provided that the operator can observe the object image and the reference scales clearly through the eye lens.

Although there have been disclosed several methods for measuring the dimensions of the crack by using the optical apparatus according to the present invention, the present invention is not limited to measure the dimension of the crack and can be applied to the measurement of any subject.

The invention claimed is:

1. An optical apparatus comprising a telescope, the telescope including a reticule plate onto which an image of an object will be projected,
   the reticule plate having a plurality of reference scales for comparison in dimension with the projected image,
   the reference scales being spaced away from each other and arranged in line in a direction orthogonal to an optical axis of the telescope or in a circumferential direction around the optical axis,
   each of the reference scales being a mark extending in the arranged direction and in another direction orthogonal to the arranged direction on the reticule plate,
   each of the marks of the reference scales having a dimension in the arranged direction that is different from the dimension in the arranged direction of the marks of the other reference scales.

2. The optical apparatus of claim 1, wherein each of the marks has a square or a round in shape when viewed in a direction parallel to the optical axis.

3. The optical apparatus of claim 1, wherein the reticule plate has indexes placed adjacent the reference scales, the indexes corresponding to the dimensions of the respective reference scales.

4. The optical apparatus of claim 1, wherein the optical apparatus also has means for measuring a distance from a reference point of the optical apparatus to an object to be collimated by the telescope.

5. The optical apparatus of claim 4, wherein the distance measuring means has a laser distance measuring unit or an ultrasonic distance measuring unit.

6. The optical apparatus of claim 4, wherein the optical apparatus has an input with which an index corresponding to each of the reference scales is inputted and a calculation means for calculating a dimension of the object by using the index inputted with the input and the distance measured by the distance measuring means.

7. The optical apparatus of claim 6, wherein the optical apparatus has an output for outputting the dimension of the object calculated by the calculation means.

8. The optical apparatus of claim 1, wherein the image of the object is a crack occurred on a concrete structure.

9. A method for measuring a dimension of an object by using an optical apparatus, comprising:
   a first step of preparing a telescope including a plate supporting a plurality of reference scales formed thereon and a distance measuring unit for measuring a first distance from a reference point of the telescope to an object to be collimated by the telescope, and
   a second step of calculating a dimension of the object by using a value obtained by comparing an image of an object projected onto the plate of the telescope with one or more reference scales and the first distance measured by the distance measuring unit.

10. The method of claim 9, wherein the object is a crack occurred on a surface on a concrete structure and the second step further includes sub-steps of
    determining a second distance from the plate to the crack by using the first distance; and
    determining the width of the crack by using the value, distance and an angle, the angle being an intersection angle between a plane and the surface, the plane including a first line connecting the reference point and the crack and a second line, the second line being positioned on the surface and extending perpendicularly to a widthwise of the crack.

11. The method of claim 9, wherein the object is a crack occurred on a surface of a concrete structure and the second step further includes sub-steps of:
    determining a second distance from the plate to the crack based upon the first distance;
    hypothetically determining a first line on the surface extending in a direction orthogonal to a transverse direction of the crack;
    determining first and second coordinates of at least two points on the first line and a third coordinate of a point on the surface;
    defining the first line by using the first and second coordinates;
    defining the surface by using the first to third coordinates;
    determining a fourth coordinate of a first intersection where a second line extending from the reference point and perpendicularly across the surface intersects with the surface;
    determining a fifth coordinates of a second intersection where a third line extending from the reference point and perpendicularly across the first line intersects with the first line;
    determining an angle between the third line connecting the reference point and the second intersection coordinates and a fourth line connecting the first intersection coordinates and the second intersection coordinates; and
    determining the width of the crack by using the value, the second distance and an angle, the angle being an intersection angle between a plane and the surface, the plane including a fifth line connecting the reference point and the crack and the first line.

12. A method for measuring a width of a crack by using an optical apparatus, comprising:
    a first step of preparing an optical apparatus provided with a telescope having a plate on which a plurality of reference scales are placed and a distance measuring unit for measuring a first distance from a crack portion on a plane to be collimated by the telescope to a reference point of the telescope; and
    a second step of calculating a width of a crack portion by using a value obtained by comparing a crack image projected onto the plate of the telescope with one or more reference scales and the first distance measured by the distance measuring units.

13. The optical apparatus of claim 1, wherein the dimension of each of the marks is greater than that of the mark disposed adjacent on one side thereof and smaller than that disposed adjacent on the other side thereof.

14. The method of claim 9, wherein the reticule plate has a plurality of reference scales for comparison in dimension with the projected image, the reference scales being spaced away from each other and arranged in line in a direction orthogonal to an optical axis of the telescope or in a circumferential direction around the optical axis, each of the reference scales being a mark extending in the arranged direction and in another direction orthogonal to the arranged direction on the reticule plate, each of the marks of the reference scales having a dimension in the arranged direction that is different from those of other marks of other reference scales so that sizes of the marks increase in the arranged direction.

* * * * *